(12) United States Patent
Tokuda et al.

(10) Patent No.: US 6,294,239 B1
(45) Date of Patent: Sep. 25, 2001

(54) ULTRAVIOLET-CURABLE ADHESIVE COMPOSITION

(75) Inventors: Kiyohisa Tokuda, Urawa; Kazuhiko Ishii, Kawagoe, both of (JP)

(73) Assignee: Nippon Kayaku Kabushiki Kaisha, Tokyo (JP)

(*) Notice: Subject to any disclaimer, the term of this patent is extended or adjusted under 35 U.S.C. 154(b) by 0 days.

(21) Appl. No.: 09/569,668

(22) Filed: May 12, 2000

Related U.S. Application Data

(63) Continuation of application No. 08/765,016, filed as application No. PCT/JP96/01134 on Apr. 25, 1996, now abandoned.

(30) Foreign Application Priority Data

Apr. 28, 1995 (JP) .................................................... 7-127407
May 17, 1995 (JP) .................................................... 7-141429

(51) Int. Cl.[7] .............................. B32B 3/02; B29C 35/08; C08F 2/50
(52) U.S. Cl. ...................... 428/65.2; 428/64.2; 428/64.3; 428/64.4; 428/64.7; 264/494; 522/18; 522/64; 522/96; 522/103; 522/182
(58) Field of Search ............................ 430/270.11, 278.1; 264/494; 428/64.2, 64.3, 64.4, 64.7, 65.2; 522/18, 64, 103, 96, 182, 39, 42, 53

(56) References Cited

U.S. PATENT DOCUMENTS

| | | | |
|---|---|---|---|
| 4,686,543 | * | 8/1987 | Tani et al. . |
| 5,154,791 | | 10/1992 | Gasser et al. ...................... 156/273.3 |
| 5,213,947 | * | 5/1993 | Ueda et al. . |
| 5,360,652 | * | 11/1994 | Kobayashi et al. . |
| 5,698,285 | * | 12/1997 | Kojima . |
| 5,989,778 | * | 11/1999 | Hozumi . |
| 6,017,603 | * | 1/2000 | Tokuda et al. . |

FOREIGN PATENT DOCUMENTS

| | | |
|---|---|---|
| 0 287 516 | 10/1988 | (EP) . |
| 2 289 472 | 11/1995 | (GB) . |
| 63-284213 | 11/1988 | (JP) . |
| 4-15280 | 1/1992 | (JP) . |
| 5-125330 | 5/1993 | (JP) . |
| 5-345790 | 12/1993 | (JP) . |
| 6-228217 | 8/1994 | (JP) . |
| 8-127760 | 5/1996 | (JP) . |

OTHER PUBLICATIONS

Chemical Technology, 9(2), 62–66 (May 20, 1985), together with a concise explanation in English.
Chemical Technology, 6(5), 41–50 (Feb. 20, 1982), together with a concise explanation in English.
RadTech '90–North America, Radiation Curing Conference and Exposition Proceedings vol. 2; Mar. 25–29, 1990.
Photopolymerization of Surface Coatings; pp. 66–211.

* cited by examiner

*Primary Examiner*—Susan W. Berman
(74) *Attorney, Agent, or Firm*—Nields & Lemack

(57) ABSTRACT

An ultraviolet-curable adhesive composition comprising a photopolymerization initiator whose molar absorption coefficient at a wavelength of 360–450 nm is at least 400 and an ultraviolet-curable compound. The adhesive composition of this invention can bond substrates which show transmittances of 0.01–20% to all of energy beams of a wavelength of 280–380 nm, to one another.

5 Claims, No Drawings

ULTRAVIOLET-CURABLE ADHESIVE COMPOSITION

CROSS REFERENCE TO RELATED APPLICATION

This application is a Continuation of U.S. Ser. No. 08/765,016 filed Dec. 19, 1996, now abandoned, which is a 371 of PCT/JP96/01134 filed Apr. 25, 1996.

TECHNICAL FIELD

This invention relates to an ultraviolet-curable adhesive, more particularly to an adhesive capable of bonding substrates which show transmittances of 0.01 to 20% to all of energy beams having wavelengths of not less than 280 nm but not more than 380 nm, to one another.

BACKGROUND ART

When opaque substrates are bonded to one another, it is difficult to use usual photocuring adhesives because the substrates do not sufficiently transmit light. In this case, therefore, heat-bonding is generally adopted. In the heat-bonding, a resin of epoxy type, melamine type, alkyd type, urethane type or acrylate type and a heat-curing agent are used in many cases and the use of a hot-melt type resin or the like is also known.

However, in the heat-bonding, there have been such problems that the substrates are warped or distorted owing to heat, and hence, the kind of substrate to which the heat-bonding can be applied has been limited. Moreover, the hot-melt type resin is inferior in thermal stability and weather resistance, and has been difficult to use under high temperature circumstances. In addition, the heat-bonding has required a curing time of several tens of minutes and hence has had a problem that it is inferior in productivity.

Therefore, there has been desired a development of an adhesive and a bonding method which are free from such problems as warpage and distortion of substrate, productivity and the like. In particular, in order to bond optical discs which will be required to have a higher recording density in future, there must be used an adhesive which causes neither warpage nor distortion of disc and is endowed with excellent characteristics.

DISCLOSURE OF THE INVENTION

The present inventors have made extensive research for solving the above problems; have consequently found that contrary to the prior common knowledge that opaque substrates cannot be bonded with a photocurable resin, opaque substrates which even slightly transmit light can be bonded with a photocurable resin; and have made this invention.

This invention is an ultraviolet-curable adhesive composition comprising at least one photopolymerization initiator whose molar absorption coefficient at a wavelength of 360 nm or more, particularly 360–400 nm is at least 200 and an ultraviolet-curable compound.

This invention is also an ultraviolet-curable adhesive composition consisting of at least one photopolymerization initiator whose molar absorption coefficient at a wavelength of 360–450 nm is at least 400 and an ultraviolet-curable compound.

This invention is further a method for bonding substrates which comprises coating the above-mentioned ultraviolet-curable adhesive composition on a substrate which shows transmittances of 0.01 to 20% to all of energy beams having wavelengths of 280–380 nm, thereafter firmly contacting the coating surface of this substrate with another substrate and then irradiating them with ultraviolet rays.

BEST MODE FOR CARRYING OUT THE INVENTION

The ultraviolet-curable adhesive composition of this invention comprises at least one photopolymerization initiator whose molar absorption coefficient at a wavelength of 360 nm or more, particularly 360–400 nm, is at least 200.

In another aspect, the ultraviolet-curable adhesive composition of this invention comprises at least one photopolymerization initiator whose molar absorption coefficient at a wavelength of 360–450 nm is at least 400.

Here, that the molar absorption coefficient in a range of the above-mentioned absorption wavelengths is at least 200 or at least 400 means that in this wavelength region, there is at least a wavelength portion at which molar absorption coefficient is at least 200 or at least 400, respectively, and it is not necessary that the molar absorption coefficient is at least 200 or at least 400 over the whole wavelength range. The content of the above photopolymerization initiator in this invention is usually 0.01–20% by weight, preferably 0.1–20% by weight, more preferably 0.5–20% by weight, and further preferably 0.5–10% by weight, approximately, in the ultraviolet-curable adhesive composition. Theses photopolymerization initiators may be used alone or in admixture of two or more in any proportion. As far as the above-mentioned conditions are satisfied, other polymerization initiators may be co-used.

As the photopolymerization initiator whose molar absorption coefficient at a wavelength of 360 nm or more is at least 200, there can be mentioned, for example, camphorquinone, 2-methyl-1-(4-methylthiophenyl)-2-(4-morphonyl)-1-propanone, 2-benzyl-2-dimethylamino-1-(4-morpholinophenyl)butanone-1, 2-chlorothioxanthone, 2,4-dimethylthioxanthone, 2,4-diisopropylthioxanthone, isopropylthioxanthone, 2,4,6-trimethylbenzoyldiphenylphosphine oxide, bis(2,6-dimethoxybenzoyl)-2,4,4-trimethylpentylphosphine oxide, (1–6-η-cumene)(η-cyclopentadienyl)iron (1+) hexafluorophosphate (1–) and the like.

In particular, as the photopolymerization initiator whose molar absorption coefficient at a avelength of 360–400 nm is at least 200, there can be entioned, for example, 2-methyl-1-(4-methylthiophenyl)- 2-(4-morphonyl)-1-propanone, 2-benzyl-2-dimethylamino-1-(4-morpholinophenyl) butanone-1,2-chlorothioxanthone, 2,4-dimethylthioxanthone, 2,4-diisopropylthioxanthone, isopropylthioxanthone, 2,4,6-trimethylbenzoyldiphenylphosphine oxide, bis(2,6-dimethoxybenzoyl)-2,4,4-trimethylpentylphosphine oxide, (1–6-η-cumene)(η-cyclopentadienyl)iron (1+) hexafluorophosphate (1–) and the like.

The photopolymerization initiator used in this invention may be one of those whose molar absorption coefficient at a wavelength of 360–450 nm is at least 400. Among them, preferable initiators are compounds whose molar absorption coefficient at a wavelength of 360–450 nm is at least 500, for example, 2-benzyl-2-dimethylamino-1-(4-morpholinophenyl)-butanone-1,2-chlorothioxanthone, 2,4-diethyl-thioxanthone, 2,4-diisopropylthioxanthone, isopropylthioxanthone, 2,4,6-trimethylbenzoyldiphenylphosphine oxide and bis(2,6-dimethoxybenzoyl)-2,4,4-trimethylpentylphosphine oxide. More preferable initiators are compounds whose molar absorption coefficient at a wavelength of 360–450 nm is at least 1,000, for example, 2-benzyl-2-dimethylamino-1-(4-morpholinophenyl)butanone-1, 2-chlorothioxanthone, 2,4-diethylthioxanthone, 2,4-diisopropylthioxanthone, isopropylthioxanthone and bis(2,6-dimethoxybenzoyl)-2,4,4-trimethylpentylphosphine oxide.

In this invention, such photopolymerization initiating assistants as amines and the like can be co-used. Such photopolymerization initiating assistants as amines and the like include, for example, 2-dimethylaminoethylbenzoate, dimethylaminoacetophenone, ethyl p-dimethylaminobenzoate, isoamyl p-dimethylaminobenzoate and the like. The amount of the photopolymerization initiating assistant used is usually preferably 0–15% by weight, more preferably 0–10% by weight, approximately, in the composition.

The ultraviolet-curable adhesive composition of this invention comprises, in addition to the above-mentioned photopolymerization initiator, an ultraviolet-curable compound. The ultraviolet-curable compound includes, for example, monomers having one or more (meth)acryloyl groups in the molecule. When a higher bonding strength and higher durability (deterioration resistance) is required, an oligomer can be co-used.

The monomers having one or more (meth)acryloyl groups in the molecule include monofunctional acrylic monomers having one (meth)acryloyl group in the molecule and polyfunctional acrylic monomers having two or more (meth)acryloyl groups in the molecule.

The monofunctional acrylic monomer includes, for example, acrylic monomers having a ring structure such as aliphatic ring, aromatic ring, heterocyclic ring or the like, aliphatic acrylates having a hydroxyl group and the like.

The acrylic monomer having a ring structure such as aliphatic ring, aromatic ring, heterocyclic ring or the like includes, for example, tricyclodecane (meth)acrylate, dicyclopentenyl (meth)acrylate, isobornyl (meth)acrylate, adamantyl (meth)acrylate, phenyl (meth)acrylate, benzyl (meth)acrylate, tetrahydrofurfuryl (meth)acrylate, morpholine acrylate, phenylglycidyl (meth)acrylate and the like. Alkylene oxide-modification products of them can also be used. In particular, those in which the alkylene oxide has 2–3 carbon atoms, are preferred, and include, for example, dicyclopentenyloxyethyl (meth)acrylate, phenyloxyethyl (meth)acrylate and the like.

The aliphatic acrylate having a hydroxyl group is preferably, for example, an acrylate in which a hydroxyl group is bonded to an aliphatic group having 2–9 carbon atoms, more preferably an acrylate in which a hydroxyl group is bonded to an aliphatic group having 2–4 carbon atoms. This aliphatic acrylate may have bonded thereto a substituent such as a phenoxy group. The aliphatic acrylate having a hydroxyl group includes, for example, 2-hydroxyethyl (meth)acrylate, 3-hydroxypropyl (meth)acrylate, 4-hydroxybutyl (meth)acrylate, 2-hydroxy-3-phenoxypropyl (meth)acrylate, and the like.

Among these monofunctional acrylic monomers, particularly preferable for keeping viscosity, resistance to moist heat and adhesiveness, are, for example, phenyloxyethyl (meth)acrylate, tricyclodecane (meth)acrylate, isobornyl (meth)acrylate, tetrahydrofurfuryl (meth)acrylate, morpholine acrylate, 2-hydroxyethyl (meth)acrylate, 2-hydroxy-3-phenoxypropyl (meth)acrylate and the like.

The polyfunctional acrylic monomers are classified into difunctional acrylic monomers and trifunctional or more functional acrylic monomers.

The difunctional acrylic monomers include, for example, acrylates of aliphatic diols having 4–9 carbon atoms, alkylene oxide type acrylic monomers and acrylic monomers having a ring structure.

The acrylates of aliphatic diols having 4–9 carbon atoms include, for example, neopentylglycol di(meth)acrylate, 1,6-hexanediol di(meth)acrylate and the like. This acrylate of the aliphatic diol may be modified with an aliphatic ester or an alkylene oxide. The aliphatic ester-modified acrylates include, for example, neopentylglycol hydroxypivalate di(meth)acrylate, caprolactone-modified neopentylglycol hydroxypivalate di(meth)acrylate and the like. The alkylene oxide-modified acrylate compounds include, for example, diethylene oxide-modified neopentylglycol di(meth)acrylate, dipropylene oxide-modified neopentylglycol di(meth)acrylate, diethylene oxide-modified 1,6-hexanediol di(meth)acrylate, dipropylene oxide-modified 1,6-hexanediol di(meth)acrylate and the like.

The alkylene oxide type acrylic monomers include, for example, neopentylglycol-modified trimethylolpropane di(meth)acrylate, polyethylene glycol di(meth)acrylate, polypropylene glycol di(meth)acrylate and the like. The acrylic monomers having a ring structure include, for example, tricyclodecanedimethylol di(meth)acrylate, dicyclopentanyl di(meth)acrylate and the like.

The trifunctional and more functional acrylic monomers include, for example, trimethylolpropane tri(meth)acrylate, pentaerythritol tri(meth)acrylate, $C_{2-5}$ aliphatic modified dipentaerythritol penta(meth)acrylate, $C_{2-5}$ aliphatic modified dipentaerythritol tetra(meth)acrylate, dipentaerythritol penta(meth)acrylate, dipentaerythritol hexa(meth)acrylate, caprolactone-modified dipentaerythritol hexa(meth)acrylate, pentaerythritol tetra(meth)acrylate, tris[(meth)acryloxyethyl] isocyanurate, caprolactonemodified tris[(meth)acryloxyethyl] isocyanurate, ditrimethylolpropane tetra(meth)acrylate and the like.

Among these polyfunctional acrylic monomers, particularly preferable difunctional acrylic monomers for keeping viscosity, resistance to moist heat and adhesiveness include, for example, acrylates of aliphatic diols having 4–9 carbon atoms such as neopentylglycol di(meth)acrylate, 1,6-hexanediol di(meth)acrylate and the like; and aliphatic ester-modified aliphatic diol acrylates such as neopentylglycol hydroxypivalate di(meth)acrylate, caprolactone-modified neopentylglycol hydroxypivalate di(meth)acrylate and the like, and particularly preferable trifunctional or more functional acrylic monomers for keeping viscosity, resistance to moist heat and adhesiveness include, for example, dipentaerythritol penta(meth)acrylate, dipentaerythritol hexa (meth)acrylate, tris[(meth)acryloxyethyl] isocyanurate and caprolactone-modified tris[(meth)acryloxyethyl] isocyanurate.

The amount of these monomers used is usually preferably about 5 to 90% by weight. These monomers may be used alone or in admixture of two or more in any proportion. In view of viscosity, the use of the monofunctional or difunctional acrylic monomer is preferred, and the trifunctional or more functional acrylic monomer is used as necessary.

When the adhesive composition of this invention is required to have a higher bonding strength and a durability (deterioration resistance) as mentioned above, an oligomer can be co-used. The oligomer which can be used in this invention is preferably one which can be dissolved in the monomer, and also preferably one having at least two (meth)acryloyl groups in the molecule. Such oligomers include, for example, epoxy (meth)acrylate, polyester (meth)acrylate and urethane (meth)acrylate.

The proportions of the monomer and the oligomer used are such that the proportion of the monomer is preferably 20–100 w/w %, more preferably 20–95 w/w % and further preferably 50–95 w/w %, and the proportion of the oligomer is preferably 0–80 w/w %, more preferably 5–80 w/w % and further preferably 5–50 w/w %. If necessary, a high molecular weight polymer, an additive and the like can also be used.

The epoxy (meth)acrylate is obtained by the reaction of an epoxy resin with (meth)acrylic acid. The epoxy resin includes, for example, bisphenol type epoxy resins such as bisphenol A type epoxy resin, bisphenol F type epoxy resin and the like; novolak type epoxy resins. The bisphenol A type epoxy resin includes, for example, Epikote 828 (trade name), Epikote 1001 (trade name) and Epikote 1004 (trade name) manufactured by Yuka Shell Epoxy Co., Ltd., and the like, the bisphenol F type epoxy resin includes, for example, Epikote 4001P (trade name), Epikote 4002P (trade name) and Epikote 4003P (trade name) manufactured by Yuka Shell Epoxy Co., Ltd., and the like. The novolak type epoxy resin includes, for example, Epikote 152 (trade name) and Epikote 154 (trade name) manufactured by Yuka Shell Epoxy Co., Ltd., and the like.

The polyester (meth)acrylate is obtained by the reaction of a polyesterpolyol with (meth)acrylic acid. The polyesterpolyol is obtained by the reaction of a polyhydric alcohol with a polybasic acid. The polyhydric alcohol includes, for example, neopentyl glycol, ethylene glycol, propylene glycol, 1,6-hexanediol, trimethylolpropane, pentaerythritol, tricyclodecanedimethylol, bis(hydroxymethyl)cyclohexane and the like. The polybasic acid includes, for example, succinic acid, phthalic acid, hexahydrophthalic anhydride, terephthalic acid, adipic acid, azelaic acid, tetrahydrophthalic anhydride and the like.

The urethane (meth)acrylate includes those obtained by the reaction of three compounds of a polyol, an organic polyisocyanate and a hydroxy(meth)acrylate and by the reaction of two compounds of an organic polyisocyanate and a hydroxy(meth)acrylate without using the polyol. The polyol includes polyether polyols such as polypropylene glycol, polytetramethylene glycol and the like; polyester polyols obtained by the reaction of the above-mentioned polyhydric alcohols with the above-mentioned polybasic acids; caprolactone polyols obtained by the reaction of the above-mentioned polyhydric alcohol with the above-mentioned polybasic acid and ε-caprolactone; and polycarbonate polyols (for example, polycarbonate polyol obtained by 1,6-hexanediol with diphenyl carbonate, and the like); etc. The organic polyisocyanate includes, for example, isophorone diisocyanate, hexamethylene diisocyanate, tolylene diisocyanate, xylene diisocyanate, diphenylmethane-4,4'-diisocyanate, dicyclopentanyl diisocyanate and the like. Those obtained by the reaction of the three compounds and those obtained by the reaction of the two compounds can be used each alone or in combination of the two.

Among these oligomers, particularly preferable for keeping the viscosity, resistance to moist heat and adhesiveness are, for example, epoxy (meth)acrylates and urethan (meth)acrylates.

These oligomers may be used alone or in admixture of two or more in any proportion. The amount of the oligomer used is usually, preferably about 0–70% by weight.

The adhesive composition of this invention can have added thereto, if necessary, for example, a polyester resin, a polycarbonate resin, a polyacrylic resin, a polyurethane resin, a polyvinyl resin or the like as the high molecular weight polymer, and moreover, if necessary, such additive as a silane coupling agent, a polymerization inhibitor, a leveling agent, a surface lubricating agent, a defoaming agent, a light stabilizer, an antioxidant, an antistatic agent, a filler and the like can also be co-used.

The silane coupling agent includes those of an alkyl type, an amine type, a (meth)acrylate type, an isocyanate type, an epoxy type, a thiol type and the like. The amount of this silane coupling agent used is about 0–10% by weight in the composition. The polymerization inhibitor includes methoquinone, methylhydroquinone and the like. The amount of the polymerization inhibitor used is about 0–1% by weight in the composition. The leveling agent, surface lubricating agent and defoaming agent include those of an organic polymer type, a silicone type, a fluorine type and the like. The antioxidant includes those of a hindered amine type, a hindered phenol type, a high molecular weight phenol type and the like. The amount of each of the above leveling agent, surface lubricating agent, defoaming agent and antioxidant used is about 0–5% by weight in the composition. The antistatic agent includes those of a quaternary ammonium type, a polyether type, a conductive powder and the like. The amount of the antistatic agent used is about 0–30% by weight in the composition. The filler includes silica gel, titanium oxide, alumina, conductive powder and the like. The amount of the filler used is about 0–70% by weight in the composition. The amounts of these additives used are appropriately determined in the above mentioned ranges depending upon the purposes.

The adhesive composition of this invention can be obtained by mixing the above-mentioned components at a temperature from room temperature to 80° C. to dissolve or disperse them. The adhesive composition of this invention can usually be used in the form of a mixture (solution, dispersion or the like) of the above-mentioned components as it is; however, if necessary (for example, for adjusting the viscosity of the composition or assuring the smoothness after coating), the adhesive composition may be used in solution or dispersion in an organic solvent. The organic solvent which can be used includes, for example, toluene, xylene, methyl ethyl ketone, isopropanol, diethylene glycol monoethyl ether acetate, diethylene glycol monobutyl ether, diethylene glycol monobutyl ether acetate, diethylene glycol monodiethyl ether and the like. When the organic solvent is used, the amount used is appropriately determined depending upon the purpose.

The cured product of the adhesive composition of this invention can be obtained by irradiation with a light such as an ultraviolet ray, a visible laser or the like in the conventional manner. The curing of the adhesive composition of this invention by irradiation with a light ray such as an ultraviolet ray or the like is specifically conducted by irradiation with an ultraviolet ray using a low pressure or high pressure mercury lamp, a metal halide lamp, a xenon lamp or the like. In particularly, the light source is preferably a lamp having a high energy intensity at 360–450 nm.

The adhesive composition of this invention is useful particularly as an adhesive for bonding opaque substrates which show transmittances of 0.01 to 20% at all wavelengths in a region of not less than 280 nm but not more than 380 nm, to each other. Of course, it is also applicable to the case where one of the substrates is transparent and the other is an opaque substrate. A particularly suitable substrate is a base board for optical disc.

The ultraviolet-curable adhesive composition of this invention can bond substrates to each other by coating the composition on an opaque substrate by use of a coating means such as a roll coater, a spin coater, a screen printing method or the like so that the thickness of a dried coating film becomes 1–50 μm, firmly contacting another substrate with this coating surface, and subsequently irradiating them with an ultraviolet ray from the upside of the opaque substrate to cure the adhesive composition. The curing of the adhesive composition of this invention can also be effected using a visible laser in place of the ultraviolet ray. Also, the handling of the adhesive composition of this invention including preparation, storage, coating and the like is preferably effected under the circumstances that light rays in the wavelength region ranging from visible to near-ultraviolet, particularly light rays of not more than 500 nm have been intercepted.

The above opaque substrate includes, for example, a substrate in which a dye, a pigment, a filler or the like is added to or dispersed in a resin such as a polyvinyl resin, a polycarbonate resin, a polyacrylate resin, an amorphous polyolefin resin or the like, an optical disc base board, a substrate in which an inorganic sputter film, particularly a metal-sputter film is formed on the surface of said resin, and further a substrate in which a radiation-curable protective film is formed on said sputter film, particularly the metal-putter film, and the like. The shape of the substrate is not limited, and may be, for example, plate-like or film-like.

An article which has as an adhesive layer a cured product of the ultraviolet-curable adhesive composition of this invention includes, for example, information-recording medium, particularly high density information recording disc, representatives of which are optical discs such as DVD (digital video (or versatile) disc), MO (optical magnetic disc), PD (phase change optical disc) and the like.

Examples are shown below to explain this invention more specifically. In the Examples, parts are by weight.

EXAMPLES 1 TO 5 (this invention) AND EXAMPLES 6 TO 9 (comparisons)

Among the various components shown in the following Table 1, the resin component was stirred and dissolved at 60° C. in one hour. Thereafter, the polymerization initiator and the like were added to prepare ultraviolet curable adhesives for Examples 1 to 5 (this invention) and Examples 6 to 9 (comparisons).

Using each of the compositions obtained, 2 sheets of opaque substrates (aluminum-deposited polycarbonate plates which show a transmittance of 0.05% at all wavelengths in a region of not less than 280 nm but not more than 380 nm) were bonded so that the coating film thickness became about 10 μm, and the composition was cured by means of a curing apparatus having a high pressure mercury lamp (80 W/cm). Thereafter, the bonded substrates were peeled and the surface state thereof was observed to evaluate the curability. The results thereof are shown in Table 1.

Using each of the compositions obtained, transparent substrates (polycarbonate plates) were bonded so that the coating film thickness became about 10 μm, and subjected to a peeling strength test at 25° C. to measure a peel value. The results thereof are shown in Table 1.

The abbreviation of each of the compositions shown in the table is as follows:

EPA-1: Bisphenol type epoxy acrylate (manufactured by NIPPON KAYAKU CO., LTD.)

UX-6101: Polyester type urethane acrylate (manufactured by NIPPON KAYAKU CO., LTD.)

UX-4101: Polyester type urethane acrylate (manufactured by NIPPON KAYAKU CO., LTD.)

M-315: Tris(acryloxyethyl) isocyanurate (manufactured by TOAGOSEI CHEMICAL INDUSTRY Co., Ltd.)

MANDA: Neopentylglycol hydropivalate diacrylate (NIPPON KAYAKU CO., LTD.)

R-604: 5-Ethyl-2-(2-hydroxy-1,1-dimethylethyl)-5-(hydroxymethyl)-1,3-dioxane diacrylate (manufactured by NIPPON KAYAKU CO., LTD.)

HDDA: 1,6-Hexanediol diacrylate (manufactured by NIPPON KAYAKU CO. LTD.)

R-561: Phenyloxyethyl acrylate (manufactured by NIPPON KAYAKU CO., LTD.)

FA-513A: Tricyclodecane acrylate (manufactured by Hitachi Chemical Co., Ltd.)

TC-101: Tetrahydrofurfuryl acrylate (manufactured by NIPPON KAYAKU CO., LTD.)

BP-100: Benzophenone (photopolymerization initiator manufactured by NIPPON KAYAKU CO., LTD., absorption wavelength: 360 nm, molar absorption coefficient: not more than 50)

DETX: 2,4-Diethylthioxanthone (photopolymerization initiator manufactured by NIPPON KAYAKU CO., LTD., absorption wavelength: 360 nm, molar absorption coefficient: not less than 3,000)

Irg-184: 1-Hydroxycyclohexyl phenyl ketone (photopolymerization initiator manufactured by Ciba Geigy, absorption wavelength: 360 nm, molar absorption coefficient: not more than 50)

Irg-369: 2-Benzyl-2-dimethylamino-1-(4-morpholinophenyl)-butanone-1 (photopolymerization initiator manufactured by Ciba Geigy, absorption wavelength: 360 nm, molar absorption coefficient: 3,000)

Irg-1800: Mixture of Irg-184 with bis(2,6-dimethoxybenzoyl)-2,4,4-trimethylpentylphosphine oxide (photopolymerization initiator manufactured by Ciba Geigy, absorption wavelength: 360 nm, molar absorption coefficient: 1,800)

TPO: 2,4,6-Trimethylbenzoyldiphenylphosphine oxide (photopolymerization initiator manufactured by BASF, absorption wavelength: 380 nm, molar absorption coefficient: 580)

DMBI: Isoamyl p-dimethylaminobenzoate (photopolymerization initiating assistant manufactured by NIPPON KAYAKU CO., LTD.)

TABLE 1

| Component | Example |  |  |  |  |  |  |  |  |
|---|---|---|---|---|---|---|---|---|---|
|  | This invention |  |  |  |  | Comparison |  |  |  |
|  | 1 | 2 | 3 | 4 | 5 | 6 | 7 | 8 | 9 |
| EPA-1 | 20 | — | — | 20 | — | 20 | 20 | 20 | 40 |
| UX-6101 | — | — | 40 | — | — | — | — | — | 10 |
| UX-4101 | — | 30 | — | 20 | 35 | — | — | 10 | — |
| M-315 | — | — | — | 20 | — | — | — | 25 | — |
| MANDA | 30 | — | 30 | — | — | 30 | 30 | — | — |
| R-604 | — | — | — | — | — | — | — | — | 20 |
| HDDA | — | 35 | — | — | 20 | — | — | — | — |
| R-561 | 50 | — | — | — | 45 | 50 | 50 | — | — |
| FA-513A | — | — | 30 | — | — | — | — | — | 30 |
| TC-101 | — | 35 | — | 40 | — | — | — | 45 | — |
| BP-100 | — | — | — | — | — | — | 5 | — | — |
| DETX | 5 | — | 5 | — | — | — | — | — | — |
| Irg-184 | — | — | — | — | — | 7 | — | 7 | 7 |
| Irg-369 | — | — | — | — | 5 | — | — | — | — |

TABLE 1-continued

| Com-ponent | Example | | | | | | | | |
|---|---|---|---|---|---|---|---|---|---|
| | This invention | | | | | Comparison | | | |
| | 1 | 2 | 3 | 4 | 5 | 6 | 7 | 8 | 9 |
| Irg-1800 | — | 3 | — | — | — | — | — | — | — |
| TPO | — | — | — | 7 | — | — | — | — | — |
| DMBI | 3 | — | 3 | — | — | — | 3 | — | — |
| Curability | ○ | ○ | ○ | Δ | ○ | X | X | X | X |
| Bonding strength (Kgf/mm) | 1320 | 1000 | 800 | 900 | 700 | 180 | 2640 | 1420 | 8 |

In Table 1, the evaluation criterion of curability is as follows:
○ . . . No tack was found.
Δ . . . Tack was slightly found.
X . . . Not cured at all.

As is clear from Table 1, the compositions of Examples 1 to 5 according to this invention are good in curability as compared with the adhesives of Examples 6 to 9 as comparative examples. Particularly from the data of Examples 1 to 3 and 5, it is seen that when photopolymerization initiators whose molar absorption coefficients at a wavelength of 300–450 nm is at least 1,000 were used, the curability was good. Accordingly, the ultraviolet-curable adhesive composition of this invention is useful as a suitable ultraviolet-curable adhesive for bonding opaque substrates to one another.

INDUSTRIAL APPLICABILITY

The ultraviolet-curable adhesive composition of this invention can be photocured in bonding opaque substrates which show transmittances of 0.01–20% at all wavelengths in a wavelength region of 280–380 nm, to one another and is very useful in bonding, for example, a base board for optical disc in view of adhesiveness of substrate, protection and productivity.

What is claimed is:

1. An information recording medium having as a bonding layer a cured product obtained by exposing an ultraviolet-curable adhesive composition comprising photopolymerization initiator and an ultraviolet-curable compound to ultraviolet radiation; wherein said initiator comprises 2,4,6-trimethylbenzoyldiphenylphosphine oxide; and said ultraviolet-curable compound is a resin composed of 20–100 w/w % of a monomer having at least one (meth)acryloyl group in the molecule and 5–80 w/w % of an oligomer having at least two (meth)acryloyl groups in the molecule; and said bonding layer exists between two opaque substrates which show transmittance of 0.01 to 20% at all wavelengths of energy beams in the region not less than 280 nm but no more than 380 nm, respectively.

2. The information recording medium according to claim 1, wherein the content of the photopolymerization initiator in the ultraviolet-curable adhesive composition is 0.01–20% by weight.

3. The information recording medium according to claim 2, wherein said content is 0.5–20% by weight.

4. The information recording medium according to claim 1, wherein the above monomer having at least one (meth)acryloyl group in the molecule is selected from the group consisting of phenyloxyethyl (meth)acrylate, tricyclodecane (meth)acrylate, isobornyl (meth)acrylate, tetrahydrofurfuryl (meth)acrylate, morpholine acrylate, 2-hydroxyethyl (meth)acrylate, 2-hydroxy-3-phenoxypropyl (meth)acrylate, neopentylglycol di(meth)acrylate, 1,6-hexanediol di(meth)acrylate, neopentylglycol hydroxypivalate di(meth)acrylate, caprolactone-modified neopentylglycol hydroxypivalate di(meth)acrylate, dipentaerythritol penta(meth)acrylate, dipentaerythritol hexa(meth)acrylate, tris[(meth)acryloxyethyl] isocyanurate and caprolactone-modified tris[(meth)acryloxyethyl] isocyanurate, and the above oligomer having at least two (meth)acryloyl groups in the molecule is epoxy (meth)acrylate or urethane (meth)acrylate.

5. The information recording medium according to claim 1, wherein the information recording medium is a digital video disc.

\* \* \* \* \*